United States Patent
Herle (10) Patent No.: US 7,165,173 B1
(45) Date of Patent: Jan. 16, 2007

(54) SYSTEM AND METHOD FOR SECURE OVER-THE-AIR ADMINISTRATION OF A WIRELESS MOBILE STATION

(75) Inventor: Sudhindra P. Herle, Plano, TX (US)

(73) Assignee: Samsung Electronics Co., Ltd., Suwon (KR)

(*) Notice: Subject to any disclaimer, the term of this patent is extended or adjusted under 35 U.S.C. 154(b) by 797 days.

(21) Appl. No.: 09/653,764

(22) Filed: Sep. 1, 2000

(51) Int. Cl.
*H04L 9/00* (2006.01)
*G06F 9/00* (2006.01)
*G06F 15/16* (2006.01)
*G06F 17/00* (2006.01)
*H04K 1/00* (2006.01)
*H04M 3/00* (2006.01)
*H04L 12/28* (2006.01)
*H04L 12/56* (2006.01)

(52) U.S. Cl. .................. 713/151; 380/270; 455/419; 726/14

(58) Field of Classification Search ............... 713/151; 709/209; 370/400, 392; 455/419; 380/270; 726/14
See application file for complete search history.

(56) References Cited

U.S. PATENT DOCUMENTS

| | | | |
|---|---|---|---|
| 5,241,598 A * | 8/1993 | Raith | 380/248 |
| 5,673,322 A * | 9/1997 | Pepe et al. | 705/52 |
| 5,841,764 A * | 11/1998 | Roderique et al. | 370/310 |
| 5,881,235 A * | 3/1999 | Mills | 709/221 |
| 6,144,849 A * | 11/2000 | Nodoushani et al. | 455/419 |
| 6,275,693 B1 * | 8/2001 | Lin et al. | 455/414.3 |
| 6,292,657 B1 * | 9/2001 | Laursen et al. | 455/411 |
| 6,453,162 B1 * | 9/2002 | Gentry | 455/433 |

(Continued)

FOREIGN PATENT DOCUMENTS

EP    1028561 A1 *   8/2000

OTHER PUBLICATIONS

"Over-the-Air Service Provisioning of Mobile Stations in Spread Spectrum Systems", May 1998.*
Jormalainen, Sami et al. "Security in the WTLS", Jan. 2000, <http://www.hut.fi/~jtlaine2/wtls/>.*

(Continued)

*Primary Examiner*—Kambiz Zand
*Assistant Examiner*—Michael J. Simitoski (57) ABSTRACT

There is disclosed a mobile station for securely communicating with base stations in a wireless network and receiving at least one of a software program, a software correction patch and provisioning data from a server in the wireless network. The mobile station comprises: 1) an RF transceiver capable of receiving wireless messages from the plurality of base stations and converting the received wireless messages to a plurality of Internet protocol (IP) packets; 2) an encryption controller capable of converting the IP packets from an encrypted format to a decrypted format; and 3) a data burst message protocol controller capable of converting the decrypted IP packets to at least one data burst message. Also disclosed is a system for secure over-the-air administration of a wireless mobile station via a base station in a wireless network. The system transmits to the wireless mobile station one or more of a software program, a software correction patch and provisioning data from a server. The system comprises: 1) a data burst message protocol controller for receiving and converting the software program, software correction patch or provisioning data into at least one data burst message; 2) an encryption controller for converting the at least one data burst message into a plurality of encrypted IP packets; and 3) an RF transceiver for converting the encrypted IP packets into at least one wireless message and transmitting the at least one wireless message to the wireless mobile station.

21 Claims, 6 Drawing Sheets

U.S. PATENT DOCUMENTS

| | | | | |
|---|---|---|---|---|
| 6,532,362 | B1* | 3/2003 | Lee et al. | 455/419 |
| 6,542,490 | B1* | 4/2003 | Ahmadvand et al. | 370/338 |
| 6,587,680 | B1* | 7/2003 | Ala-Laurila et al. | 455/411 |
| 6,587,684 | B1* | 7/2003 | Hsu et al. | 455/419 |
| 6,609,148 | B1* | 8/2003 | Salo et al. | 709/217 |
| 6,647,260 | B1* | 11/2003 | Dusse et al. | 455/419 |
| 6,680,922 | B1* | 1/2004 | Jorgensen | 370/328 |
| 6,687,901 | B1* | 2/2004 | Imamatsu | 717/173 |

OTHER PUBLICATIONS

Saarinen, Markku-Juhani. "Attacks Against the WAP WTLS Protocol", Sep. 1999.*

Bai, Yong et al. "TCP over IS-707", 1999.*

Baksha, Bikram S. et al. "Improving Performance of TCP over Wireless Networks", 1997 IEEE.*

Bao, Gang. "Performance evaluation of TCP/RLP protocol stack over CDMA wireless link", 1996 Qualcomm.*

Gellens, R. "Wireless Device Configuration (OTASP/OTAPA) via ACAP" (RFC 2636), Jul. 1999.*

Joshi, Atul S. "Performance Evaluation of TCP over Radio Link Protocol in TIA/EIA/IS-99 Environment", 1999 IEEE.*

Nova Southeastern University. "Operating a Mobile Internet Nodes to a High Degree of Efficiency and Effectiveness", <http://www.scis.nova.edu/~councilc/mmis620/del-a.htm>.*

The TCP/IP Guide. "IP Datagram Encapsulation", <http://www.tcpipguide.com/free/t_IPDatagramEncapsulation.htm>.*

Syed, Hamid Mahmood et al. "TCP Performance and Buffer Provisioning for Internet in Wireless Networks", Proc. Int'l Symp. on Modeling, Analysis and Simulation of Computer and Telecommunication System, 48-55, 1999.*

Hansen, Harri. "IPsec and Mobile-IP in Mobile Ad Hoc Networking", Apr. 2000, <http://www.tml.tkk.fi/Opinnot/Tik-110.551/2000/papers/IPsec/>.*

* cited by examiner

SYSTEM AND METHOD FOR SECURE OVER-THE-AIR ADMINISTRATION OF A WIRELESS MOBILE STATION

CROSS-REFERENCE TO RELATED APPLICATIONS

The present invention is related to those disclosed in the following United States Patent Applications:

1. Ser. No. 09/500,499, filed Feb. 9, 2000, entitled "SYSTEM AND METHOD FOR SECURE OVER-THE-AIR PROVISIONING OF A MOBILE STATION FROM A PROVISIONING SERVER VIA A TRAFFIC CHANNEL;"

2. Ser. No. 09/501,468, filed Feb. 9, 2000, entitled "SYSTEM AND METHOD FOR SECURE PROVISIONING OF A MOBILE STATION FROM A PROVISIONING SERVER USING IWF-BASED IP ADDRESS TRANSLATION;"

3. Ser. No. 09/475,602, filed on Dec. 30, 1999, entitled "SYSTEM AND METHOD FOR SECURE PROVISIONING OF A MOBILE STATION FROM A PROVISIONING SERVER USING IP ADDRESS TRANSLATION AT THE BTS/BSC;" and 4. Ser. No. 09/475,760, filed on Dec. 30, 1999, entitled "SYSTEM AND METHOD FOR SECURE PROVISIONING OF A MOBILE STATION FROM A PROVISIONING SERVER USING ENCRYPTION".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to wireless networks and, more specifically, to a system for secure over-the-air (OTA) provisioning, updating and administering of cellular phone handsets and other mobile devices.

BACKGROUND OF THE INVENTION

Reliable predictions indicate that there will be over 300 million cellular telephone customers worldwide by the year 2000. Within the United States, cellular service is offered by cellular service providers, by the regional Bell companies, and by the national long distance operators. The enhanced competition has driven the price of cellular service down to the point where it is affordable to a large segment of the population.

The current generation of cellular phones is used primarily for voice conversations between a subscriber handset (or mobile station) and another party through the wireless network. A smaller number of mobile stations are data devices, such as personal computers (PCs) equipped with cellular/wireless modems. Because the bandwidth for a current generation mobile station is typically limited to a few tens of kilobits per second (Kbps), the applications for the current generation of mobile stations are relatively limited. However, this is expected to change in the next (or third) generation of cellular/wireless technology, sometimes referred to as "3G" wireless/cellular, where a much greater bandwidth will be available to each mobile station (i.e., 125 Kbps or greater). The higher data rates will make Internet applications for mobile stations much more common. For instance, a 3G cell phone (or a PC with a 3G cellular modem) may be used to browse web sites on the Internet, to transmit and to receive graphics, to execute streaming audio and streaming video applications, and the like. In sum, a much higher percentage of the wireless traffic handled by 3G cellular systems will be Internet protocol (IP) traffic and a lesser percentage will be traditional voice traffic.

In order to make wireless services as convenient and as affordable as possible, wireless service providers frequently sell wireless telephone handsets (or other types of mobile stations) directly to potential subscribers from display booths in supermarkets and department stores. Simple instructions are provided to guide the buyer through the process of activating the cellular handset and signing up for wireless services to become a subscriber. In conventional cellular systems, the handset buyer activates the new handset and signs up for service by dialing "*228xx" on the handset keypad in accordance with the handset instructions. The value of "xx" varies according to the identity of the wireless service provider that sells the handset. Dialing "*228xx" on the handset keypad initiates a service provisioning process that enables the handset to communicate normally with wireless networks.

Although initially unprovisioned, the new handset must, of necessity, have certain minimum radio frequency (RF) communication capabilities that enable the handset to become provisioned. Dialing "*228xx" on the handset keypad automatically initiates a special purpose call that connects the handset buyer to an operator. The operator requests certain account information from the buyer, such as personal information, a credit card number, home billing address, and the like. When the account information is collected and the account is set up, the operator instructs the handset buyer to enter several sequences of passwords, code numbers, menu selection commands, and the like, that enable certain functions in the handset.

This process is frequently referred to as "service provisioning." Service provisioning activates in the wireless handset a Number Assignment Module (NAM), which gives the handset a unique phone number for incoming calls and provides a roaming capability by identifying approved wireless carriers. Service provisioning also activates in the handset a Preferred Roaming List (PRL), which is a list of frequencies/bands owned by each carrier in each geographical region and which may identify preferred and/or prohibited frequencies in each region as well. Finally, service provisioning activates an authentication code, sometimes referred to as an "A-key," in the cellular handset. The handset uses the A-key to authenticate the handset when the subscriber attempts to access the wireless network.

The wireless network uses a home location register (HLR) to store the A-key, the phone number, the roaming capability information, and other data related to each handset that has been or is being authenticated and provisioned by the wireless network. The HLR is a permanent database used by the wireless service provider to identify or verify a subscriber and store individual subscriber data related to features and services. The subscriber's wireless service provider uses the HLR data when the subscriber is accessing the wireless network in the subscriber's home coverage area. Other wireless service providers also use the HLR data (typically accessed via wireline telephone networks) when the subscriber roams outside the subscriber's home coverage area.

Numerous service provisioning standards have been created to allow new wireless service subscribers to activate wireless services, including the IS-683-A protocol. The IS-683-A protocol is a TIA/EIA standard for provisioning and administering a handset over the air. The IS-683-A protocol utilizes data burst messages in a traffic channel between the mobile station handset and the base station to transmit administrative data. The data burst messages are also used to transport SMS messages. The data burst messages can also be used to transport other kinds of information such as Java bytecodes, commercial advertisements to be displayed on the wireless handset, software patches to correct errors on the handset, and the like.

Unfortunately, protocols such as IS-683-A and SMS have numerous drawbacks. These protocols do not permit roaming (i.e., the mobile station that is provisioned or administered must be in the subscriber's home network). The IS-683-A protocol also requires specific equipment and software in the wireless network for the express purpose of communicating under the IS-683-A protocol. IS-683-A protocol does not provide a capability for downloading application software nor does it allow the wireless service provider to automatically provide upgrades to a mobile station. For example, if a wireless service provider upgrades its network base stations from radio link protocol 3 (RLP3) to radio link protocol 4 (RLP4) in order to support higher data rates, the IS-683-A protocol does not permit the wireless service provider to download software over the air that upgrades the mobile station to RLP4.

It would be preferable to automate the service provisioning process and the upgrading and administering of handsets to the greatest extent possible in order to reduce labor costs, to eliminate errors, and to make the process more user-friendly by minimizing or eliminating subscriber interaction. In particular, it would be far more convenient to perform over-the-air (OTA) cellular service provisioning, handset upgrading and handset administering by accessing a provisioning server via an Internet connection. In such a scenario, the handset does not place a voice call to an operator, but rather places a "data call" that transmits Internet protocol (IP) packets to, and receives IP packets from, a base station of the wireless network.

Therefore, there is a need in the art for improved systems and methods for performing automatic service provisioning, upgrading and administering of wireless handsets (and other types of mobile stations). In particular, there is a need in the art for systems and methods for performing secure over-the-air provisioning and upgrading of wireless devices. More particularly, there is a need for systems and methods that are capable of performing secure over-the-air provisioning and upgrading of wireless devices even when the subscriber is roaming outside the subscriber's home network.

SUMMARY OF THE INVENTION

To address the above-discussed deficiencies of the prior art, it is a primary object of the present invention to provide a mobile station capable of securely communicating with a plurality of base stations in a wireless network and receiving at least one of a software program, a software correction patch and provisioning data from a server associated with the wireless network. According to an advantageous embodiment of the present invention, the mobile station comprises: 1) an RF transceiver capable of receiving wireless messages from the plurality of base stations and converting the received wireless messages to a plurality of Internet protocol (IP) packets; 2) an encryption controller capable of converting the IP packets from an encrypted format to a decrypted format; and 3) a data burst message protocol controller capable of converting the decrypted IP packets to at least one data burst message.

According to one embodiment of the present invention, the encryption controller is capable of encrypting and decrypting IP packets according to at least one of: 1) IP Sec tunneling protocol; 2) Secure Shell (SSH) tunneling protocol; 3) Secure Sockets Layer/Transport Layer Security (SSL/TLS); and 4) point-to-point tunneling protocol (PPTP).

According to another embodiment of the present invention, each of the IP packets comprise an IP layer and an IP packet payload.

According to yet embodiment of the present invention, the IP packet payload comprises a transmission control protocol (TCP) layer.

According to still another embodiment of the present invention, the IP packet payload comprises an over-the-air service provisioning payload associated with the at least one data burst message.

According to a further embodiment of the present invention, each of the IP packets comprises an IP layer, a transmission control protocol (TCP) layer and a IP packet payload.

According to a still further embodiment of the present invention, the IP packet payload comprises an over-the-air service provisioning payload associated with the at least one data burst message.

According to a yet further embodiment of the present invention, the data burst message protocol controller is capable of converting the decrypted IP packets to the at least one data burst message according to at least one of: 1) an IS-683-A protocol; 2) a short messaging service (SMS) protocol; and 3) extensible mark-up language (XML) protocol.

It also is a primary object of the present invention to provide a system for secure over-the-air administration of a wireless mobile station via a base station in a wireless network. The system is capable of transmitting to the wireless mobile station at least one of a software program, a software correction patch and provisioning data from a server associated with the wireless network. In an advantageous embodiment of the present invention, the system comprises: 1) a data burst message protocol controller capable of receiving and converting the at least one of a software program, a software correction patch and provisioning data into at least one data burst message; 2) an encryption controller capable of converting the at least one data burst message into a plurality of encrypted IP packets; and 3) an RF transceiver capable of converting the encrypted IP packets into at least one wireless message and transmitting the at least one wireless message to the wireless mobile station.

In one embodiment of the present invention, the encryption controller is capable of encrypting and decrypting IP packets according to at least one of: 1) IP Sec tunneling protocol; 2) Secure Shell (SSH) tunneling protocol; 3) Secure Sockets Layer/Transport Layer Security (SSL/TLS); and 4) point-to-point tunneling protocol (PPTP).

In another embodiment of the present invention, each of the IP packets comprises an IP layer and a IP packet payload.

In still another embodiment of the present invention, the IP packet payload comprises a transmission control protocol (TCP) layer.

In yet another embodiment of the present invention, the IP packet payload comprises an over-the-air service provisioning payload associated with the at least one data burst message.

In a further embodiment of the present invention, each of the IP packets comprises an IP layer, a transmission control protocol (TCP) layer and a IP packet payload.

In a still further embodiment of the present invention, the IP packet payload comprises an over-the-air service provisioning payload associated with the at least one data burst message.

In a yet further embodiment of the present invention, the data burst message protocol controller is capable of converting the at least one of a software program, a software correction patch and provisioning data to the at least one data burst message according to at least one of: 1) an IS-683-A protocol; 2) a short messaging service (SMS) protocol; and 3) extensible mark-up language (XML) protocol.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. The functionality associated with any controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
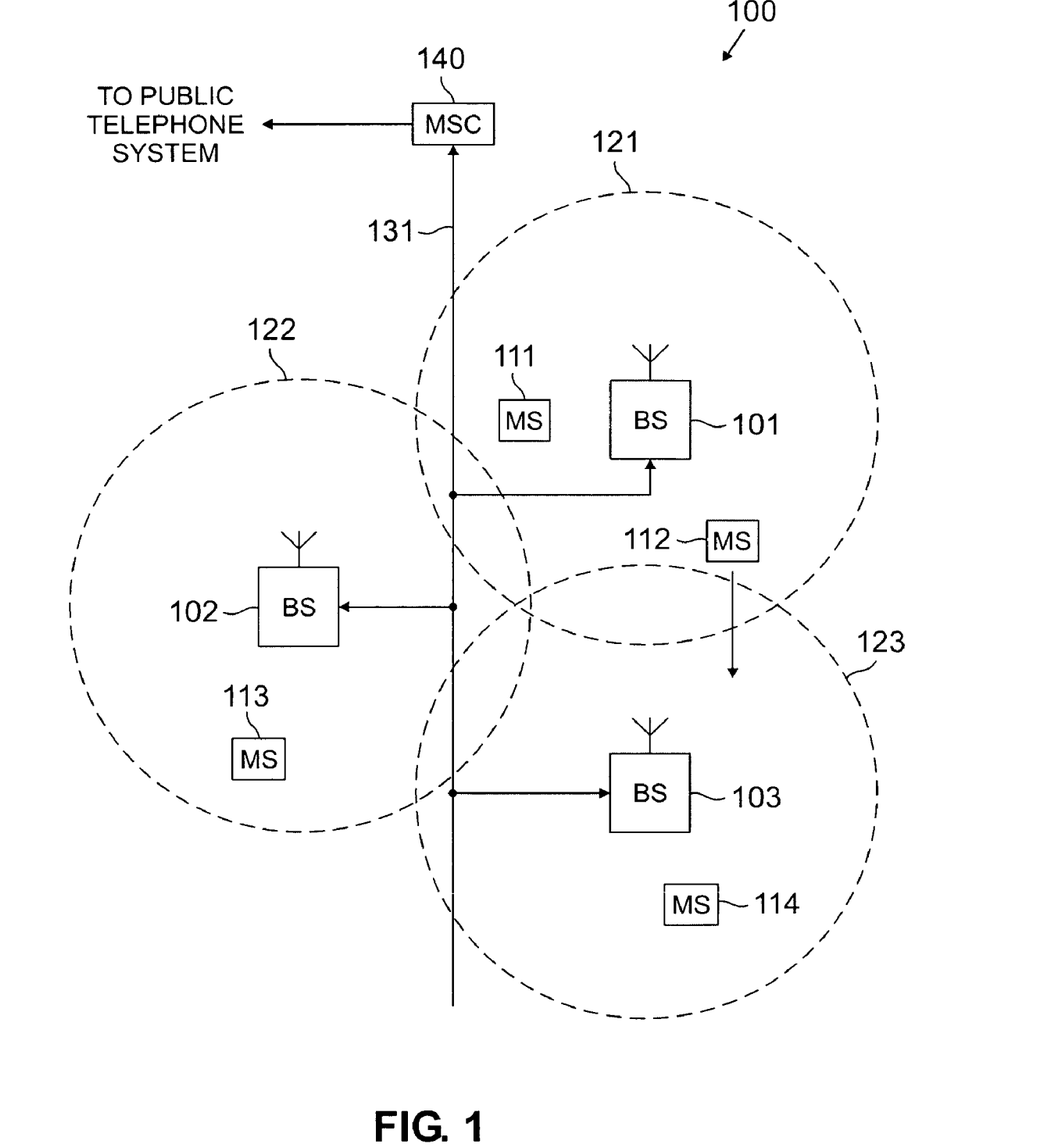
FIG. 1 illustrates a general overview of an exemplary wireless network according to one embodiment of the present invention.

FIG. 1 illustrates a general overview of an exemplary wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable wireless communication devices, including conventional cellular telephones, PCS handset devices, portable computers, telemetry devices, and the like.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and natural and man-made obstructions.

In one embodiment of the present invention, one or more of BS 101, BS 102, and BS 103 may comprise a base station controller (BSC) and at least one base transceiver station (BTS) associated with each BSC. Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purposes of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system or the Internet. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

One or more of mobile stations 111–114 may initially be unprovisioned devices. That is, necessary configuration data, such as Number Assignment Module (NAM) data, Preferred Roaming List (PRL) data, or authentication code (or "A-key") data may not be present in, for example, MS 112 or, if present, may not be properly configured or enabled, so that MS 112 is unable to properly access wireless network 100 via BS 101. Furthermore, the operator of wireless network 100 may wish to transmit (i.e., download) software patches to correct existing errors in MS 112 or software upgrades to add new service capabilities (e.g., new RLP version) to MS 112. To enable such unprovisioned devices to operate in wireless network 100, an over-the-air (OTA) capability is provided in wireless network 100 to perform service provisioning, upgrading, and mobile station administration.

Figure 2:
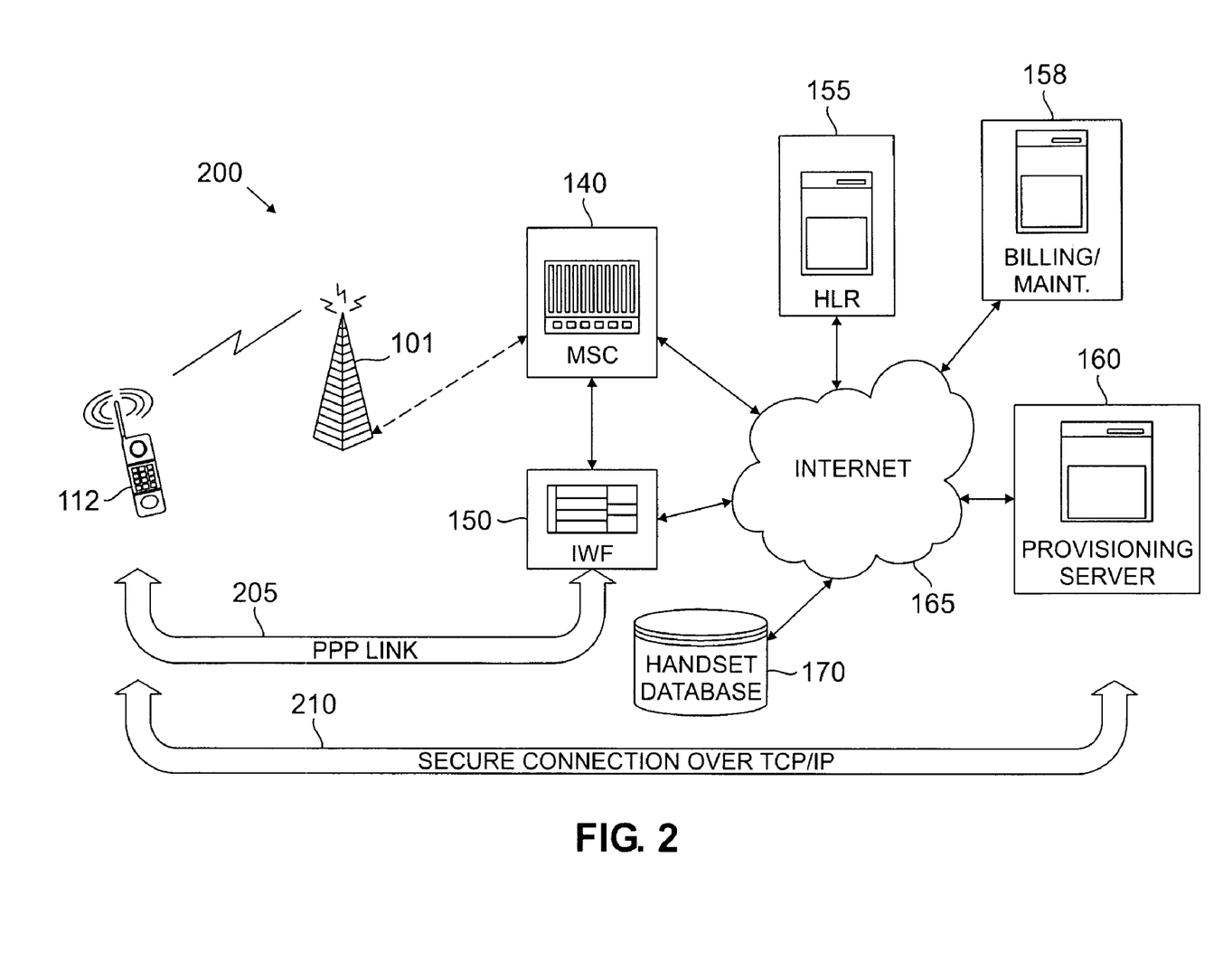
FIG. 2 illustrates an alternate view of selected portions of the exemplary wireless network in FIG. 1 that perform over-the-air (OTA) service provisioning according to one embodiment of the present invention.

FIG. 2 illustrates an alternate view of selected portions of exemplary wireless network 100 that perform over-the-air (OTA) service provisioning according to one embodiment of the present invention. MS 112, BS 101, and MSC 140 are still present, as in FIG. 1. In FIG. 2, wireless network 100 further comprises interworking function (IWF) unit 150, home location register (HLR) 155, billing and maintenance server 158, provisioning server 160, and handset database 170. Provisioning server 160 is a system-wide central server that may be located remote from the other components of wireless network 100, namely, BS 101, MSC 140, IWF unit 150, and HLR 155. In order to access data in provisioning server 160, MSC 140 communicates with provisioning server 160 via intranet/Internet 165 (hereafter "Internet 165"). Since data within wireless network 100 may be communicated in one or more of a wide variety of communication protocols, according to the choices made by the wireless service provider, IWF unit 150 is needed to translate the "native" communication transport protocol that carries application data in wireless network 100 into Internet protocol (IP) based data packets suitable for transmission in Internet 165.

It should be noted that the scope of the present invention is not limited to wireless networks that use the Internet to link base stations and provisioning servers. In alternate embodiments of the present invention, Internet 165 may actually be a large intranet having a relatively minimal amount of security that links a group of base station to one or more provisioning servers.

As will be explained below in greater detail, when an unprovisioned mobile station, such as MS 112, accesses wireless network 100 (via BS 101), BS 101 and/or MSC 140, using the handset data in HLR 155, identifies MS 112 as an unprovisioned handset and establish a session with provisioning server 160 via Internet 165 in order to perform service provisioning of MS 112. However, because Internet 165 is a network not owned or controlled by the wireless service provider that operates wireless network 100, the present invention provides security protection that prevents an unauthorized person from interfering with sensitive operations such as provisioning, parameter administration, software download and the like.

Furthermore, if upgrade software or a software correction patch is available, wireless network 100 is capable of sending a notification message to MS 112 informing MS 112 of the upgrade and/or patch. The subscriber operating MS 112 may then choose to download the upgrade or correction patch via BS 101 and MSC 140. In the exemplary embodiment, it is assumed that, in addition to provisioning data, provisioning server 160 is also responsible for storing and downloading software upgrades and software correction patches. In one embodiment of the present invention, provisioning server 160 may retrieve provisioning data, software upgrades and correction patches from handset database 170 via Internet 165.

The foregoing is accomplished by establishing a data call between MS 112 and wireless network 100, as indicated by logical data path 205 in FIG. 2. Logical data path 205 represents, for example, a Point-to-Point Protocol (PPP) link connecting MS 112 and IWF unit 150 that is suitable for transmitting IP packets between MS 112 and IWF unit 150. Wireless network 100 also establishes a secure connection between MS 112 and provisioning server 160, as indicated by logical data path 210 in FIG. 2. Logical data path 210 represents a virtual secure (i.e., encrypted) transmission control protocol/Internet protocol (TCP/IP) connection between MS 112 and provisioning server 160. The actual physical path is established through MS 112, BS 101, MSC 140, IWF unit 150, and processing server 160.

In one embodiment of the present invention, security is provided by a tunneling protocol that encrypts the TCP/IP packet payloads, including the TCP layer information, in both directions between MS 112 and provisioning server 160. In another embodiment of the present invention, security is provided by, for example, an IP Sec tunnel that encrypts the entire IP packet payloads, including the TCP layer, in both directions between MS 112 and provisioning server 160.

SSH is well known to those familiar with the art. For reference, see "Secure Shell Protects Network Communications" by George Lavender, http://istpub/berkeley.edu:4201/bcc/Winter98/gen.ssh.html; "SSH Basics", http://www.unikarrlsruhe.de/~ig25/ssh-faq/ssh-faq-2.html; and "Getting Started with SSH" by Kimmo Suominen, http://www.tac.nyc.ny.us/~kim/ssh/.

Throughout the Detailed Description of the Invention section of the present application, exemplary embodiments of the present invention are described which use SSH tunneling protocol or IP Sec tunneling protocol to provide encrypted data paths over which the mobile station and the provisioning server communicate. It should be understood, however, that this is by way of example only and should not be construed so as to limit the scope of the present invention in any way. Those skilled in the art will recognize that the present invention may readily be implemented using other secure tunneling protocols. In particular, in other embodiments of the present invention, a secure, encrypted data path may be provided using one or more of IP Sec, SSH, Secure Sockets Layer/Transport Layer Security (SSL/TLS), which is an Internet standard popularized by Netscape browsers, or PPTP, which is Microsoft's version of a point-to-point tunneling protocol (mostly based on PPP). In general, the present invention may be implemented using any Virtual Private Network (VPN) technology.

Similarly, this disclosure describe exemplary embodiments of the present invention which use IS-683-A protocol to transmit data burst messages between the mobile station and the provisioning server. Again, this is by way of example only and should not be construed to limit the scope of the present invention. Those skilled in the art will recognize that the present invention may readily be implemented using other protocols to transmit provisioning content in data burst messages between the mobile station and the provisioning server. In particular, in other embodiments of the present invention, provisioning content may be transmitted in data burst messages between the mobile station and the provisioning server using one or more of IS-683-A protocol, Short Messaging Service (SMS) protocol, and Extensible Mark-up Language (XML) derivatives, including (but not limited) to HTML and XHTML.

Figure 3:
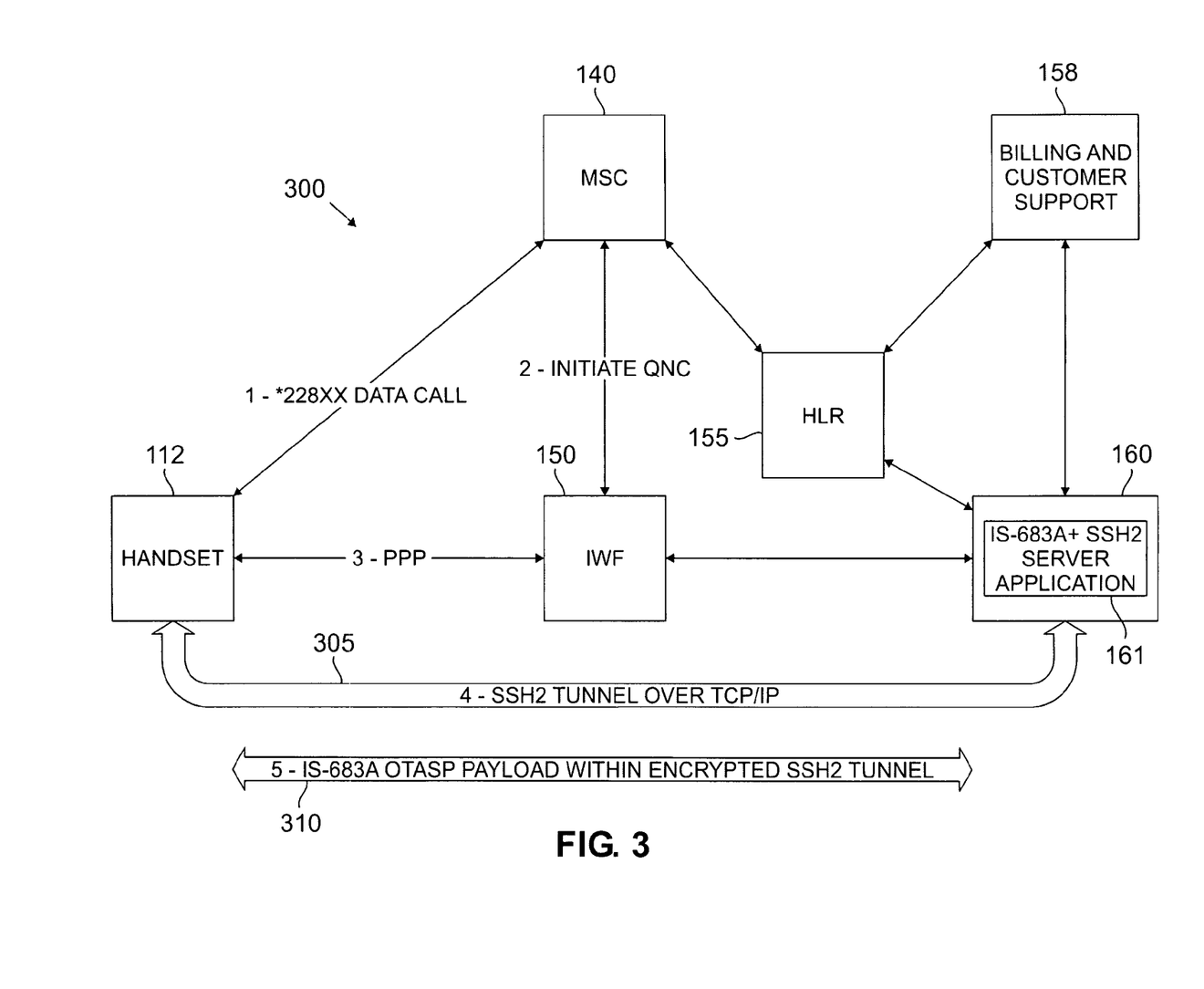
FIG. 3 illustrates an alternate view showing logical connections between selected portions of the exemplary wireless network according to one embodiment of the present invention.

FIG. 3 illustrates an alternate view showing logical connections between selected portions of exemplary wireless network 100 according to one embodiment of the present invention. BS 101, MS 112, MSC 140, IWF unit 150, HLR 155, billing and maintenance server 158, provisioning server 160, Internet 165, handset database 170, and logical data path 205 are still present, as in FIG. 2. Provisioning processor 160 executes software application 161, which is capable of communicating under IS-683-A and SSH protocols. Logical data path 305 represents a virtual secure (i.e., encrypted) SSH tunnel over a TCP/IP connection between MS 112 and provisioning server 160. Logical data path 310 represents an IS-683A over-the-air-service provisioning (OTASP) payload within a virtual secure (i.e., encrypted) SSH tunnel between MS 112 and provisioning server 160.

FIG. 3 also illustrates a sequence of connections, labeled 1–5, indicating the flow of information between MS 112, MSC 140, IWF unit 150, and provisioning processor 160. MS 112 initiates a provisioning data call when the subscriber, for example, presses a special Internet key on the handset, or dials "228XX" on the keypad. The provisioning data call connects MS 112 to MSC 140 via BS 101. Next, MSC 140 initiates a Quick-Net-Connect (QNC) call with IWF unit 150. When completed, a Point-to-Point (PPP) connection is established between MS 112 and IWF unit 150. MSC 140 also exchanges required provisioning data with HLR 155 and billing and maintenance server 158.

IWF 150 communicates with software application 161 to establish logical data path 305, which is a SSH tunnel over a TCP/IP connection between provisioning server 160 and MS 112. Within the SSH tunnel, logical data path 310 transfer IS-683A OTASP payload data between MS 112 and software application 161. Once provisioning is completed, logical data path 305 may also provide secure transfer of information, such as software patches or software upgrade data, between MS 112 and provisioning server 160.

Figure 4:
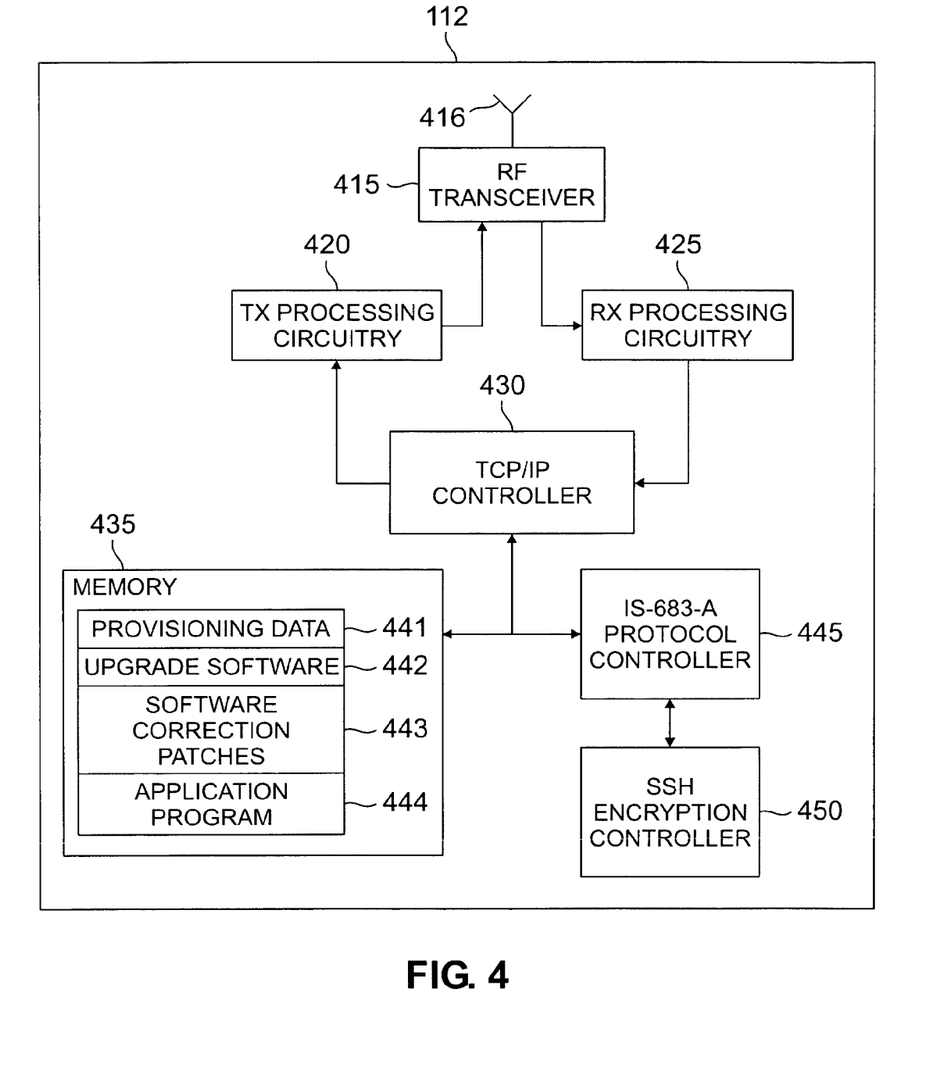
FIG. 4 illustrates an exemplary mobile station according to one embodiment of the present invention.

FIG. 4 illustrates mobile station 112 in greater detail according to one embodiment of the present invention. MS 112 comprises RF transceiver 415, antenna array 416, transmitter (TX) processing circuitry 420, receiver (RX) processing circuitry 425, TCP/IP controller 430, memory 435, IS-683-A protocol controller 445, and SSH encryption controller 450. Memory 435 further comprises provisioning data file 441, upgrade software file 442, software correction patches 443, and application program 444.

RF transceiver 415 transmits and receives forward channel and reverse channel messages through antenna array 416 and converts them to and from digital level signals. Antennal array 416 transfers forward and reverse channel messages between wireless network 100 and RF transceiver 415. Transmitter (TX) processing circuitry 420 receives reverse channel data from other parts of MS 112, such as voice data from a microphone or fax/modem/Internet protocol (IP) data if MS 112 is a personal computer, a facsimile machine, or the like. Receiver (RX) processing circuitry 425 processes forward channel data, such as incoming voice data, fax/modem/IP data, control channel data, and paging channel data. RX processing circuitry 425 transfers the processed forward channel data to other portions of MS 112 or to connected devices, such as a display monitor or a speaker.

TCP/IP controller 430 transfers data between TX processing circuitry 420 or RX processing circuitry 425 and memory 435 or IS-683-A protocol controller 445. TCP/IP controller 430 converts forward channel data from RX processing circuitry 425 from TCP/IP format to a format suitable for storage in one or more of provisioning data 441 file, upgrade software file 442, or software correction patches 443. Similarly, TCP/IP controller 430 converts IS-683-A data to TCP/IP format, and transfers the TCP/IP data to TX processing circuitry 420 for transmission in a reverse traffic channel.

Memory 435 stores software and data required for system operation of MS 112. Provisioning data file 441 stores provisioning data, such as NAM data, PRL data, A-key data, and the like. Upgrade software file 442 contains software upgrade data that may be downloaded from BS 101. Similarly, software correction patches 443 stores software patches, that may be downloaded from BS 101. Application program 444 comprises software that operates MS 112.

IS-683-A protocol controller 445 converts data sent to or received from TCP/IP controller 430 to and from IS-683-A OTASP payloads. SSH encryption controller 450 encrypts and decrypts data that is sent in or received in OTASP payloads. SSH encryption controller 450 encrypts reverse channel data to be sent to TCP/IP controller 430 and decrypts forward channel data received from TCP/IP controller 430 prior to storage in memory 435. Thus, SSH encryption controller 450 provides secure communications over unsecure channels using public key/private key encryption techniques.

In order to communicate securely with MS 112, provisioning server 160 contains many of the same non-RF components that are found in MS 112. That is, software application 161 executed by provisioning server 160 may comprise a TCP/IP controller, an IS-683-A protocol controller and an SSH encryption controller that are similar to corresponding components in MS 112. Furthermore, provisioning server 160 also comprises a memory similar to memory 435 that may be used to hold provisioning data, upgrade software and software correction patches that are to be downloaded to MS 112.

Figure 5A:
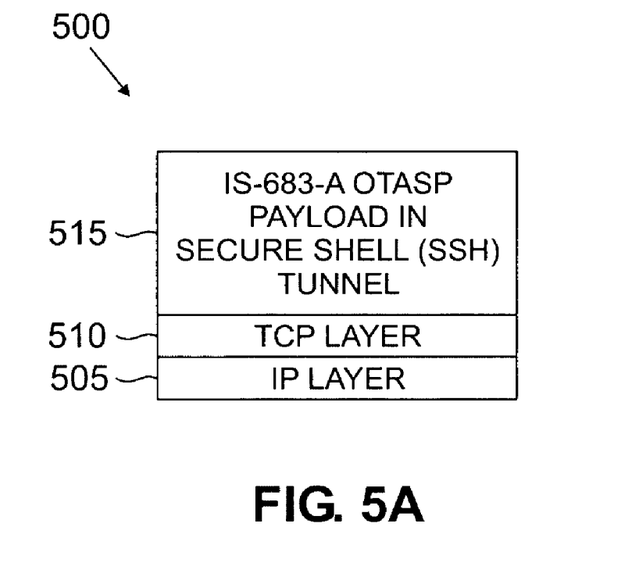
FIG. 5A illustrate an exemplary IP packet in which an IS-683-A over-the-air service provisioning (OTASP) payload has been encrypted using a Secure Shell tunneling protocol according to one embodiment of the present invention.

FIG. 5A illustrates exemplary IP packet 500, in which an IS-683-A over-the-air service provisioning (OTASP) payload has been encrypted using a Secure Shell (SSH) tunneling protocol according to one embodiment of the present invention. Exemplary IP packet 500 comprises IP layer 505, TCP layer 510, and encrypted layer 515, which contains a IS-683-A OTASP payload in a Secure Shell tunnel. Encrypted layer 515 is the only portion of exemplary IP packet 500 that is encrypted.

Figure 5B:
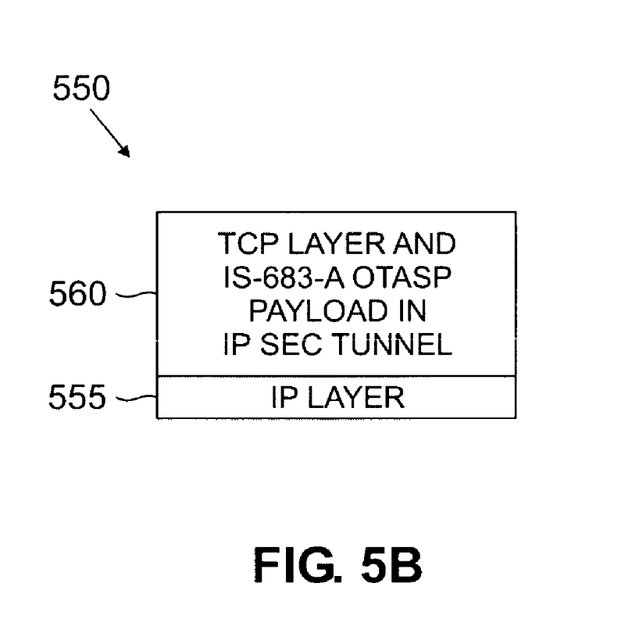
FIG. 5B illustrate an exemplary IP packet in which the TCP layer and an IS-683-A over-the-air service provisioning (OTASP) payload have been encrypted using an IP Sec tunneling protocol according to one embodiment of the present invention.

FIG. 5B illustrates exemplary IP packet 550, in which the TCP layer and an IS-683-A over-the-air service provisioning (OTASP) payload have been encrypted using an IP Sec tunneling protocol according to one embodiment of the present invention. Exemplary IP packet 550 comprises IP layer 555 and encrypted layer 560, which contains the TCP layer data and an IS-683-A OTASP payload encrypted in an IP Sec tunnel. Only IP layer 555 is not encrypted.

Figure 6:
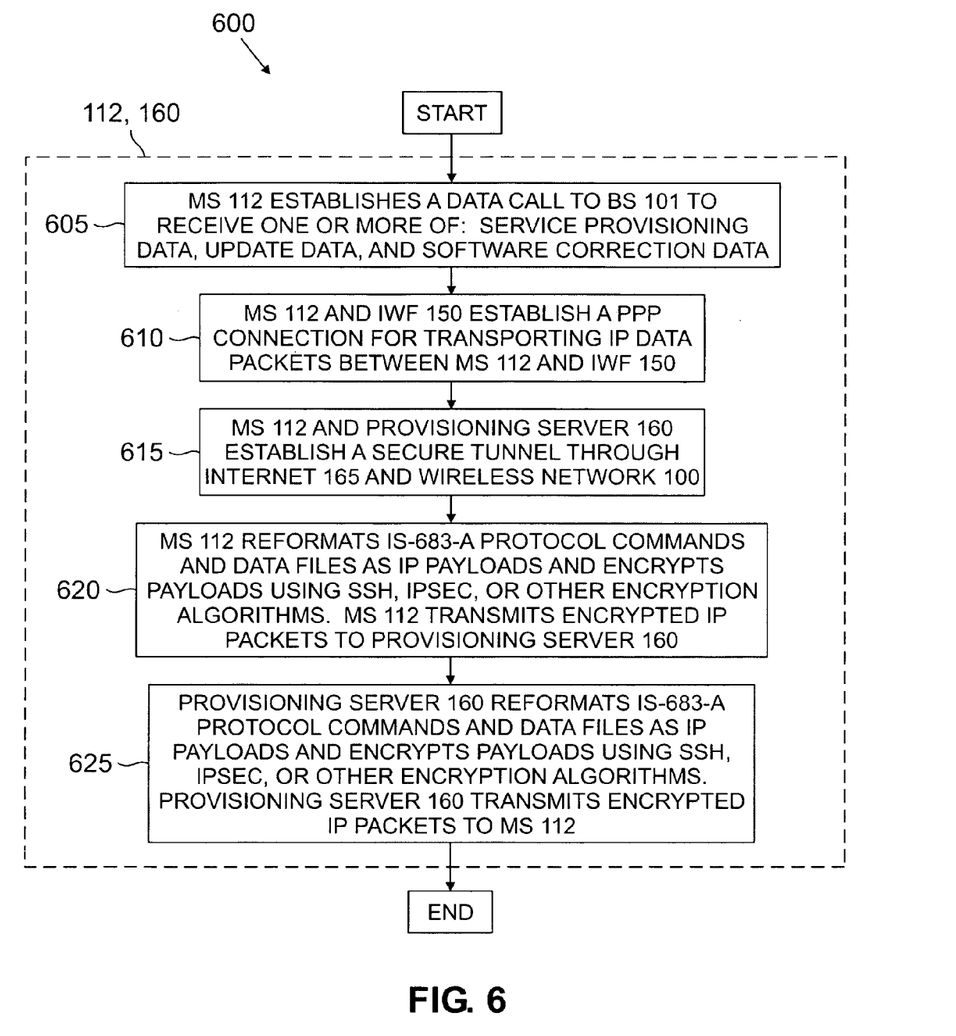
FIG. 6 depicts flow chart 600, which illustrates an exemplary secure data downloading operation in wireless network 100 according to one embodiment of the present invention.

FIG. 6 depicts flow chart 600, which illustrates an exemplary secure software downloading operation in wireless network 100 according to one embodiment of the present invention. Initially, the operator of MS 112 establishes a data call to BS 101 in order to transfer one or more of service provisioning data, update data, and software correction (patch) data (process step 605). Working in conjunction with BS 101, MS 112 and IWF unit 150 establish a virtual PPP connection for transporting IP data packets between MS 112 and IWF unit 150 (process step 610). In turn, IWF unit 150 establishes an IP session with provisioning server 160 through Internet 165.

Next, MS 112 and provisioning server 160 establish a virtual secure tunnel through Internet 165 and wireless network 100 (process step 615). MS 112 reformats IS-683-A protocol commands and data files as IP payloads and encrypts the IP packets using SSH, IPSEC, or other encryption algorithms. MS 112 then transfers the encrypted IP packets in the reverse data channel to provisioning server 160. MS 112 also receives in the forward channel from provisioning server 160 IS-683-A protocol commands and data files as encrypted IP payloads and decrypts the IP packets using SSH, IP Sec, or other decryption algorithms (process step 620).

Similarly, provisioning server 160 reformats IS-683-A protocol commands and data files as IP payloads and encrypts the IP packets using SSH, IP Sec, or other encryption algorithms. Provisioning server 160 then transfers the encrypted IP packets in the forward data channel to MS 112. Provisioning server 160 also receives in the reverse data channel from provisioning server 160 encrypted IP payloads that contain IS-683-A protocol commands and data files. Provisioning server 160 decrypts the IP packets using SSH, IP Sec, or other decryption algorithms (process step 625). MS 112 and provisioning server 160 continue to exchange and process encrypted data until the initiated transaction is completed.

Although the present invention has been described in detail, those skilled in the art should understand that they can make various changes, substitutions and alterations herein without departing from the spirit and scope of the invention in its broadest form.

What is claimed is:

1. A mobile station that communicates with a plurality of base stations in a wireless network and receives at least one of a software program, a software correction patch and provisioning data from a server associated with said wireless network, said mobile station comprising:

an RF transceiver that receives wireless messages from said plurality of base stations and converts said received wireless messages to a plurality of Internet protocol (IP) packets;

an encryption controller that converts said IP packets from an encrypted format to a decrypted format according to at least one of:

IP Sec tunneling protocol;

Secure Shell (SSH) tunneling protocol;

Secure Sockets Layer/Transport Layer Security (SSL/TLS); and point-to-point tunneling protocol (PPTP); and a data burst message protocol controller that converts said decrypted IP packets to at least one data burst message, wherein said mobile station accesses at least one of said software program, said software correction patch and said provisioning data via a public IP network and automatically applies at least one of said software program, said software correction patch and said provisioning data.

2. The mobile station as set forth in claim 1 wherein each of said IP packets comprise IP layer information and an IP packet payload.

3. The mobile station as set forth in claim 2 wherein said IP packet payload comprises transmission control protocol (TCP) layer information.

4. The mobile station as set forth in claim 3 wherein said IP packet payload comprises an over-the-air service provisioning payload associated with said at least one data burst message.

5. The mobile station as set forth in claim 1 wherein each of said IP packets comprises IP layer information, transmission control protocol (TCP) layer information and a IP packet payload.

6. The mobile station as set forth in claim 5 wherein said IP packet payload comprises an over-the-air service provisioning payload associated with said at least one data burst message.

7. The mobile station as set forth in claim 1 wherein said data burst message protocol controller converts said decrypted IP packets to said at least one data burst message according to at least one of: 1) an IS-683-A protocol; 2) a short messaging service (SMS) protocol; and 3) extensible mark-up language (XML) protocol.

8. A system for secure over-the-air administration of a wireless mobile station via a base station in a wireless network, said system that transmits to said wireless mobile station at least one of a software program, a software correction patch and provisioning data from a server associated with said wireless network, said system comprising:

a data burst message protocol controller that receives and converts said at least one of a software program, a software correction patch and provisioning data into at least one data burst message;

an encryption controller that converts said at least one data burst message into a plurality of encrypted IP packets according to at least one of:

IP Sec tunneling protocol;

Secure Shell (SSH) tunneling protocol;

Secure Sockets Layer/Transport Layer Security (SSL/TLS); and point-to-point tunneling protocol (PPTP); and an RF transceiver that converts said encrypted IP packets into at least one wireless message and transmits said at least one wireless message to said wireless mobile station, wherein said mobile station accesses at least one of said software program, said software correction patch and said provisioning data via a public IP network and automatically applies at least one of said software program, said software correction patch and said provisioning data.

9. The system as set forth in claim 8 wherein each of said IP packets comprises IP layer information and a IP packet payload.

10. The system as set forth in claim 9 wherein said IP packet payload comprises transmission control protocol (TCP) layer information.

11. The system as set forth in claim 10 wherein said IP packet payload comprises an over-the-air service provisioning payload associated with said at least one data burst message.

12. The system as set forth in claim 8 wherein each of said IP packets comprises IP layer information, transmission control protocol (TCP) layer information and a IP packet payload.

13. The system as set forth in claim 12 wherein said IP packet payload comprises an over-the-air service provisioning payload associated with said at least one data burst message.

14. The system as set forth in claim 8 wherein said data burst message protocol controller that converts said at least one of a software program, a software correction patch and provisioning data to said at least one data burst message according to at least one of: 1) an IS-683-A protocol; 2) a short messaging service (SMS) protocol; and 3) extensible mark-up language (XML) protocol.

15. For use in a wireless network, a method for securely transmitting to a wireless mobile station at least one of a software program, a software correction patch and provisioning data from a server associated with the wireless network, the method comprising the steps of:

receiving and converting the at least one of a software program, a software correction patch and provisioning data into at least one data burst message;

converting said at least one data burst message into a plurality of encrypted IP packets;

converting said encrypted IP packets into at least one wireless message according to at least one of:

IP Sec tunneling protocol;

Secure Shell (SSH) tunneling protocol;

Secure Sockets Layer/Transport Layer Security (SSL/TLS); and point-to-point tunneling protocol (PPTP); and transmitting said at least one wireless message to said wireless mobile station, wherein said mobile station accesses at least one of said software program, said software correction patch and said provisioning data via a public IP network and automatically applies at least one of said software program, said software correction patch and said provisioning data.

16. The method as set forth in claim 15 wherein each of the said IP packets comprises IP layer information and a IP packet payload.

17. The method as set forth in claim 16 wherein said IP packet payload comprises transmission control protocol (TCP) layer information.

18. The method as set forth in claim 17 wherein said IP packet payload comprises an over-the-air service provisioning payload associated with said at least one data burst message.

19. The method as set forth in claim 15 wherein each of said IP packets comprises IP layer information, transmission control protocol (TCP) layer information and a IP packet payload.

20. The method as set forth in claim 19 wherein the said IP packet payload comprises an over-the-air service provisioning payload associated with said at least one data burst message.

21. The method as set forth in claim 15 wherein said steps of receiving and converting said at least one of a software program, a software correction patch and provisioning data into at least one data burst message comprises the sub-sep of converting said at least one of a software program, a software correction patch and provisioning data into at least one data burst message according to at least one of: 1) an IS-683-A protocol; 2) a short messaging service (SMS) protocol; and 3) extensible mark-up language (XML) protocol.

* * * * *